United States Patent
Favale

[11] Patent Number: 5,899,569
[45] Date of Patent: May 4, 1999

[54] MEAT THERMOMETER AND CUTTING DEVICE COMBINATION

[76] Inventor: Michael A. Favale, 173 Eastside Blvd., Waterbury, Conn. 06706

[21] Appl. No.: 09/048,424

[22] Filed: Mar. 26, 1998

[51] Int. Cl.⁶ .............................. G01K 1/14; G01K 13/00
[52] U.S. Cl. .................... 374/141; 374/155; 374/207; D8/57; D10/57
[58] Field of Search ..................................... 374/185, 155, 374/141, 207; D8/57; D10/57

[56] References Cited

U.S. PATENT DOCUMENTS

| | | | |
|---|---|---|---|
| D. 227,294 | 6/1973 | Maynard | 374/155 |
| 1,918,258 | 7/1933 | Fredricksen | 374/155 |
| 3,373,611 | 3/1968 | Trott | 374/155 |
| 3,504,544 | 4/1970 | Tymkewicz | 374/155 |
| 3,552,210 | 1/1971 | Wright, Jr. | 374/155 |
| 3,952,596 | 4/1976 | Patel | 374/207 |
| 4,059,997 | 11/1977 | Trott | 374/155 |
| 4,083,250 | 4/1978 | Goff et al. | 374/155 |
| 4,253,334 | 3/1981 | Hakanssön et al. | 374/185 |
| 4,580,909 | 4/1986 | McIntosh | 374/155 |
| 4,950,085 | 8/1990 | Horvath | 374/207 |
| 5,634,719 | 6/1997 | La Neve | 374/141 |

FOREIGN PATENT DOCUMENTS

| | | | |
|---|---|---|---|
| 0028010 | 10/1910 | Germany | 374/155 |
| 2420201 | 10/1975 | Germany | 374/155 |
| 0235327 | 4/1986 | Germany | 374/141 |

*Primary Examiner*—Diego Gutierrez
*Assistant Examiner*—Maria Fernandez

[57] ABSTRACT

A meat thermometer and cutting device combination is provided including a thermometer housing for being removably situated within a piece of cooking meat. Also included is a thermometer situated on the thermometer housing for detecting and indicating a current temperature of the meat. A cutting edge is situated on the thermometer housing for cutting the meat to view an interior thereof.

7 Claims, 2 Drawing Sheets

MEAT THERMOMETER AND CUTTING DEVICE COMBINATION

BACKGROUND OF THE INVENTION

1. Field of the Invention

The present invention relates to meat thermometers and more particularly pertains to a new meat thermometer and cutting device combination for measuring a temperature of a piece of meat and cutting the same with a single device.

2. Description of the Prior Art

The use of meat thermometers is known in the prior art. More specifically, meat thermometers heretofore devised and utilized are known to consist basically of familiar, expected and obvious structural configurations, notwithstanding the myriad of designs encompassed by the crowded prior art which have been developed for the fulfillment of countless objectives and requirements.

Known prior art meat thermometers include U.S. Pat. No. 4,059,997; U.S. Pat. No. 4,083,250; U.S. Pat. No. 3,373,611; U.S. Pat. No. 5,312,188; U.S. Pat. No. 1,918,258; and Foreign patents WO 90/11497 and 0 291 571 A1.

In these respects, the meat thermometer and cutting device combination according to the present invention substantially departs from the conventional concepts and designs of the prior art, and in so doing provides an apparatus primarily developed for the purpose of measuring a temperature of a piece of meat and cutting the same with a single device.

SUMMARY OF THE INVENTION

In view of the foregoing disadvantages inherent in the known types of meat thermometers now present in the prior art, the present invention provides a new meat thermometer and cutting device combination construction wherein the same can be utilized for measuring a temperature of a piece of meat and cutting the same with a single device.

The general purpose of the present invention, which will be described subsequently in greater detail, is to provide a new meat thermometer and cutting device combination apparatus and method which has many of the advantages of the meat thermometers mentioned heretofore and many novel features that result in a new meat thermometer and cutting device combination which is not anticipated, rendered obvious, suggested, or even implied by any of the prior art meat thermometers, either alone or in any combination thereof.

To attain this, the present invention generally comprises a thermometer housing having a first linear knife blade with a cutting edge along a length thereof. The first linear knife blade is further equipped with a pointed end and a hollow interior. The thermometer housing further has a first linear handle integrally coupled to the first linear knife blade and further forms an obtuse angle therewith. As such, the first linear knife blade is removably situated within a piece of cooking meat. Situated within the hollow interior of the first linear knife blade of the thermometer housing is a temperature sensor for detecting a current temperature. Associated therewith is a temperature indicator including a disk-shaped container fixedly coupled to an interconnection between the first linear knife blade and the first linear handle. As shown in FIGS. 1 & 4, a transparent window is secured on the container for viewing an interior space thereof. For depicting a temperature currently detected by the temperature sensor, a dial is situated within the interior space of the container of the temperature indicator and connected to the temperature sensor. Finally, a cutting device includes a second linear knife blade with a cutting edge along a length thereof and a pointed end. The cutting device further includes a second linear handle integrally coupled to the second linear knife blade and further forming an obtuse angle therewith. An interconnection between the second linear knife blade and the second linear handle is pivotally coupled to that of the first linear knife blade and the first linear handle. As shown in FIGS. 3 & 4, a spring is situated between the first and second linear handles. By this structure, the first and second linear knives have a biased orientation in abutment with each other and an unbiased, separated orientation.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new meat thermometer and cutting device combination apparatus and method which has many of the advantages of the meat thermometers mentioned heretofore and many novel features that result in a new meat thermometer and cutting device combination which is not anticipated, rendered obvious, suggested, or even implied by any of the prior art meat thermometers, either alone or in any combination thereof.

It is another object of the present invention to provide a new meat thermometer and cutting device combination which may be easily and efficiently manufactured and marketed.

It is a further object of the present invention to provide a new meat thermometer and cutting device combination which is of a durable and reliable construction.

An even further object of the present invention is to provide a new meat thermometer and cutting device combination which is susceptible of a low cost of manufacture with regard to both materials and labor, and which accordingly is then susceptible of low prices of sale to the consuming public, thereby making such meat thermometer and cutting device combination economically available to the buying public.

Still yet another object of the present invention is to provide a new meat thermometer and cutting device combination which provides in the apparatuses and methods of the prior art some of the advantages thereof, while simultaneously overcoming some of the disadvantages normally associated therewith.

Still another object of the present invention is to provide a new meat thermometer and cutting device combination for both measuring a temperature of a piece of meat and cutting the same with a single device.

Even still another object of the present invention is to provide a new meat thermometer and cutting device combination that includes a thermometer housing for being removably situated within a piece of cooking meat. Also included is a thermometer situated on the thermometer housing for detecting and indicating a current temperature of the meat. A cutting edge is situated on the thermometer housing for cutting the meat to view an interior thereof.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figures 1, 2:
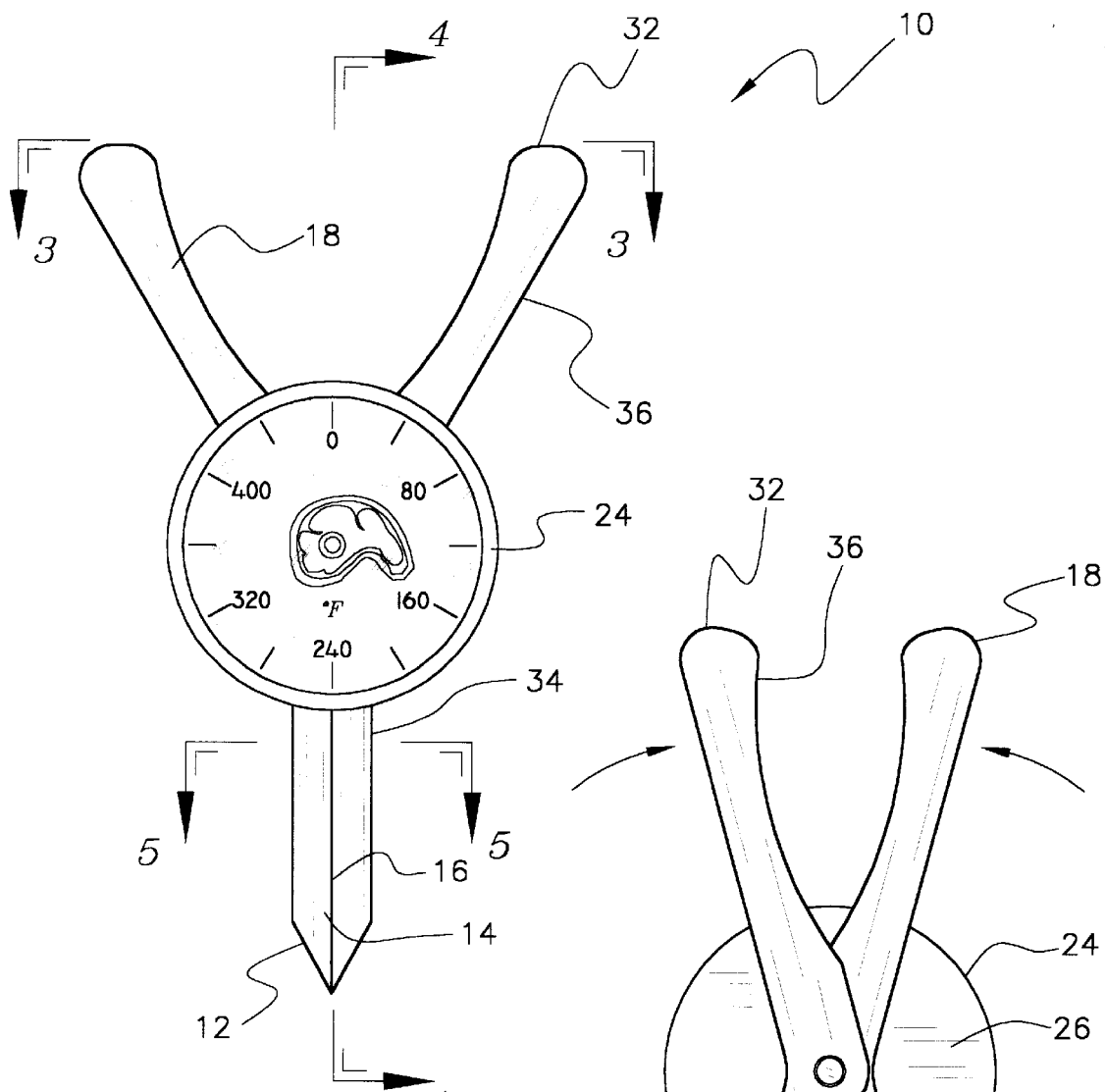
FIG. 1 is a front view of a new meat thermometer and cutting device combination according to the present invention.
FIG. 2 is a rear view of the present invention.

With reference now to the drawings, and in particular to FIGS. 1 through 5 thereof, a new meat thermometer and cutting device combination embodying the principles and concepts of the present invention and generally designated by the reference numeral 10 will be described.

The present invention, designated as numeral 10, includes a thermometer housing 12 having a first linear knife blade 14 with a cutting edge 16 along a length thereof. The first linear knife blade is further equipped with a pointed end and a hollow interior. The thermometer housing also has a first linear handle 18 integrally coupled to the first linear knife blade and further forms an obtuse angle therewith. As such, the first linear knife blade is removably situated within a piece of cooking meat.

Figure 4:
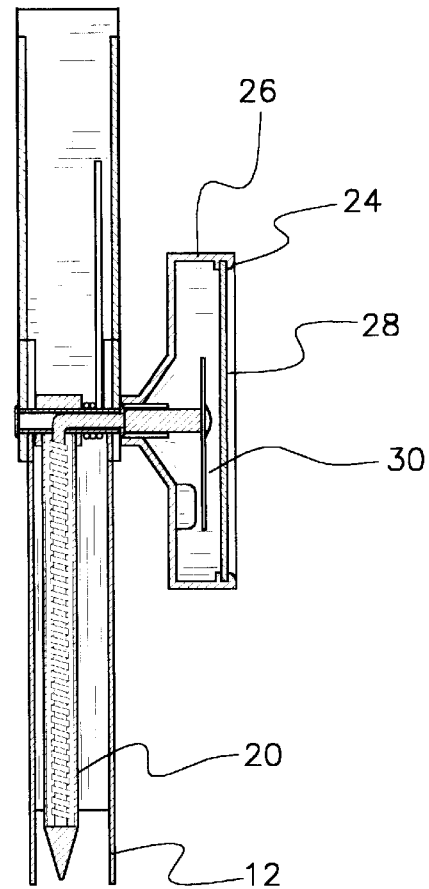
FIG. 4 is a side cross-sectional view of the present invention taken along line 4—4 shown in FIG. 1.
Figure 5:
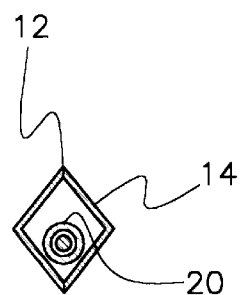
FIG. 5 is a cross-sectional view of the present invention taken along line 5—5 shown in FIG. 1.

Situated within the hollow interior of the first linear knife blade of the thermometer housing is a temperature sensor 20 for detecting a current temperature. Associated therewith is a temperature indicator 24 including a disk-shaped container 26 fixedly coupled to an interconnection between the first linear knife blade and the first linear handle. As shown in FIGS. 1 & 4, a transparent window 28 is secured on the container for viewing an interior space thereof. For depicting a temperature currently detected by the temperature sensor, a dial 30 is situated within the interior space of the container of the temperature indicator and connected to the temperature sensor. Such dial preferably takes the form of a replica of a piece of meat.

Finally, a cutting device 32 includes a second linear knife blade 34 with a cutting edge along a length thereof and a pointed end. The cutting device further includes a second linear handle 36 integrally coupled to the second linear knife blade and further forming an obtuse angle therewith. It should be noted that the knives and handles are preferably of a similar length and size.

Figure 3:
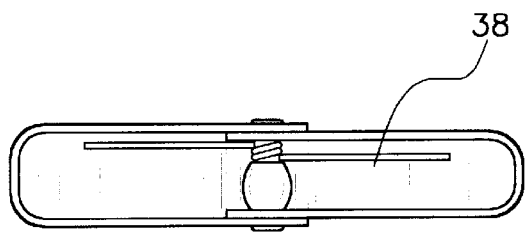
FIG. 3 is a top view of the present invention.

An interconnection between the second linear knife blade and the second linear handle is pivotally coupled to that of the first linear knife blade and the first linear handle. As shown in FIGS. 3 & 4, a spring 38 is situated between the first and second linear handles. By this structure, the first and second linear knives have a biased orientation in abutment with each other and an unbiased, separated orientation.

In use, the first linear knife blade is situated within a piece of meat. Once the temperature is at least a predetermined amount so as to kill various microorganisms, the second linear handle may be biased toward the first linear handle for the purpose of cutting an incision within the meat. A texture of the meat may thus be inspected.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A meat thermometer and cutting device comprising, in combination:

a thermometer housing including a first linear knife blade, the blade including a cutting edge along a length thereof, a pointed end, and a hollow interior, the thermometer housing further including a first linear handle integrally coupled to the first linear knife blade and further forming an obtuse angle therewith, wherein the first linear knife blade is removably situated within a piece of cooking meat;

a temperature sensor situated within the hollow interior of the first linear knife blade of the thermometer housing for detecting a current temperature;

a temperature indicator including a disk-shaped container fixedly coupled to an interconnection between the first linear knife blade and the first linear handle, a transparent window secured on the container for viewing an interior space thereof, and a dial situated within the interior space of the container of the temperature indicator and connected to the temperature sensor for depicting a temperature currently detected by the temperature sensor; and a cutting device including a second linear knife blade with a cutting edge along a length thereof and a pointed end, the cutting device further including a second linear handle integrally coupled to the second linear knife blade and further forming an obtuse angle therewith, an interconnection between the second linear knife blade and the second linear handle being pivotally coupled to that of the first linear knife blade and the first linear handle, a spring being situated between the first and second linear handles such that the first and second linear knives have a biased orientation in abutment with each other and an unbiased orientation in a separated orientation.

2. A meat thermometer and cutting device combination comprising:

a thermometer housing for being removably situated within a piece of cooking meat;

thermometer means situated on the thermometer housing for detecting and indicating a current temperature of the meat; and a cutting blade hingably coupled to the thermometer housing for cutting the meat to view an interior thereof.

3. A meat thermometer and cutting device combination as set forth in claim 2 wherein a spring is situated between the cutting blade and thermometer housing.

4. A meat thermometer and cutting device combination as set forth in claim 2 wherein the thermometer housing and the cutting blade each have a handle mounted thereon.

5. A device comprising:

a thermometer for detecting and indicating a current temperature of a food item; and an elongated cutting utensil hingably coupled to the thermometer for cutting the food item to view an interior thereof.

6. A device as set forth in claim 5 wherein a spring is situated between the cutting utensil and the thermometer.

7. A device as set forth in claim 5 wherein the thermometer and the cutting utensil each have a handle mounted thereon.

* * * * *